United States Patent [19]

MacLeay

[11] Patent Number: 4,866,136
[45] Date of Patent: Sep. 12, 1989

[54] PROCESS FOR PRODUCING POLYMER BOUND HINDERED AMINE LIGHT STABILIZERS

[75] Inventor: Ronald E. MacLeay, Williamsville, N.Y.

[73] Assignee: Pennwalt Corporation, Philadelphia, Pa.

[21] Appl. No.: 85,036

[22] Filed: Aug. 12, 1987

[51] Int. Cl.$^4$ .............................................. C08F 8/30
[52] U.S. Cl. .................................. 525/327.6; 524/99; 524/102; 525/375
[58] Field of Search ............... 524/99, 102; 525/327.6, 525/375

[56] References Cited

U.S. PATENT DOCUMENTS

| | | | |
|---|---|---|---|
| 2,769,804 | 11/1956 | Hanson | 526/65 |
| 2,971,939 | 2/1961 | Baer | 525/285 |
| 2,977,334 | 3/1961 | Zopf et al. | 525/327.6 |
| 2,989,517 | 6/1961 | Hanson et al. | 526/60 |
| 3,336,267 | 8/1967 | Zimmerman et al. | 526/208 |
| 3,483,276 | 12/1969 | Mahlman | 525/240 |
| 3,488,311 | 1/1970 | Burdick et al. | 524/517 |
| 3,509,110 | 4/1970 | Di Giulio et al. | 526/272 |
| 3,553,177 | 1/1971 | Hazen et al. | 526/208 |
| 3,555,001 | 1/1971 | Wallis et al. | 530/358 |
| 3,560,455 | 2/1971 | Hazen et al. | 526/272 |
| 3,560,456 | 2/1971 | Hazen et al. | 526/272 |
| 3,560,457 | 2/1971 | Hazen et al. | 526/272 |
| 3,632,561 | 1/1972 | Gibb et al. | 526/219.4 |
| 3,723,375 | 3/1973 | Field et al. | 524/549 |
| 3,755,354 | 8/1973 | Holub et al. | 548/406 |
| 3,884,882 | 5/1975 | Caywood, Jr. | 525/205 |
| 3,919,354 | 11/1975 | Moore et al. | 525/257 |
| 3,998,907 | 12/1976 | Di Giulio | 525/192 |
| 4,097,551 | 6/1978 | Di Giulio et al. | 525/71 |
| 4,108,943 | 8/1978 | Lee | 524/371 |
| 4,341,695 | 7/1982 | Lee | 524/342 |
| 4,348,524 | 9/1982 | Karrer et al. | 546/187 |
| 4,381,373 | 4/1983 | Ikuma | 525/194 |
| 4,404,322 | 9/1983 | Seito et al. | 525/74 |
| 4,486,570 | 12/1984 | Lordi et al. | 525/93 |
| 4,506,056 | 3/1985 | Gaylord | 524/445 |
| 4,520,171 | 5/1985 | William et al. | 525/102 |
| 4,522,983 | 6/1985 | Le-Khac | 525/285 |
| 4,522,992 | 6/1985 | Verbrugge | 526/272 |
| 4,544,682 | 10/1985 | Corbett et al. | 525/327.6 |
| 4,591,619 | 5/1986 | Kitsunai et al. | 525/285 |
| 4,730,017 | 3/1988 | Avar | 524/103 |
| 4,804,717 | 2/1989 | Ramey | 525/375 |

FOREIGN PATENT DOCUMENTS

| | | |
|---|---|---|
| 1169061 | 6/1984 | Canada . |
| 1180497 | 1/1985 | Canada . |
| 0061785 | 10/1982 | European Pat. Off. . |
| 0076691 | 4/1983 | European Pat. Off. . |
| 3024525 | 2/1982 | Fed. Rep. of Germany . |
| 3430802 | 3/1986 | Fed. Rep. of Germany . |
| 57-55901 | 4/1982 | Japan . |
| 59221315 | 4/1982 | Japan . |
| 57-100104 | 6/1982 | Japan . |
| 57-125241 | 8/1982 | Japan . |
| 57-125242 | 8/1982 | Japan . |
| 58-120608A | 7/1983 | Japan . |
| 58-180506 | 10/1983 | Japan . |
| 59-221314 | 12/1984 | Japan . |
| 60-149646A | 7/1985 | Japan . |
| 759545 | 8/1980 | U.S.S.R. . |
| 2145100A | 3/1985 | United Kingdom . |

OTHER PUBLICATIONS

CA 97 199015Q (1982).
G. De Vito et al., "Functionalization of Amorphous Ethylene-Propylene Copolymer by Free Radical Initiated Grafting of Unsaturated Molecules", *Journal of Polymer Science: Polymer Chemistry Ed.*, vol. 22, pp. 1335-1347, (1984).

*Primary Examiner*—Veronica P. Hoke
*Attorney, Agent, or Firm*—Panitch, Schwarze, Jacobs & Nadel

[57] ABSTRACT

N-(polyalkyl-4-piperidinyl)imide containing polymer is prepared by blending together a mixture of a polymer containing anhydride functions and a 4-amino-polyalkylpiperidine or its 1-alkyl or 1-acyl derivatives and heating said materials in the blend, either prior to or during the blending step to the molten stage of the polymer; thereafter, heating said blend above 180° C. for a sufficient time to form the product. All volatile by-products are removed either simultaneously or subsequently with the above 180° C. heating step.

29 Claims, No Drawings

PROCESS FOR PRODUCING POLYMER BOUND HINDERED AMINE LIGHT STABILIZERS

This invention provides an improved process for preparing polymer bound hindered amine light stabilizers by reacting amino-substituted polyalkylpiperidines with anhydride containing polymers or copolymers in a melt blending step at a temperature high enough to form imidized copolymers containing hindered amine light stabilizing groups. The reaction can be carried out in the prsence of primary monoamino-substituted $C_8$ to $C_{200}$ alkanes or poly(oxyalkylenes) of 8–200 carbons to form imidized or partially imidized anhydride copolymers where a portion of the imidized units contains polyalkylpipiridinyl (HALS) substituents and another portions contains alkyl or poly(oxyalkylene) of 8–200 carbons substituents. The reaction can be carried out in any conventional melt mixing apparatus which applies sufficient heat (e.g., 175° C. to 300° C.) and shear to the ingredients to obtain a satisfactory blend.

BACKGROUND OF THE INVENTION

This invention provides an improved process for preparing polymer bound hindered amine light stabilizers by reacting 4-amino-substituted polyalkylpiperidines with anhydride containing polymers or copolymers in a melt blending step to form imidized copolymers containing pendant hindered amine light stabilizing groups.

It is known in the prior art to attach 4-amino-2,2,6,6-tetramethylpiperidine and 4-amino-1,2,2,6,6-pentamethylpiperidine to maleic anhydride copolymers in solution. Ger Offen 3,024,525 describes the reaction of cationic maleic anhydride homo- and copolymers with 4-amino-2,2,6,6-tetramethylpiperidine in solution to form the corresponding imide containing polymers.

Maleic anhydride modified polyolefins have been reacted with 4-amino-2,2,6,6-tetramethylpiperidine to form the corresponding N-substituted maleimide modified polyolefins (U.S. Pat. No. 4,520,171). The reactions were all run by refluxing the amine and maleic anhydride copolymer in an aromatic solvent and removing water as it formed.

GB 2,145,100A discloses the reaction of maleic anhydride copolymers with polalkylpiperidine derivatives. It is stated that reactions of copolymers of maleic anhydride with $R^{15}$-$NH_2$ (where $R^{15}$ is a polyalkylpiperidyl group) are preferably carried out in a solvent.

The imidization of maleic anhydride copolymers with ammonia or primary amines is normally carried out in a solvent or in a suspension. Various solvents that have been used for the imidization step include toluene, xylene, chlorobenzene, tetrahydrofuran, dimethylformamide, dimethylsulfoxide, methyl ethyl ketone and acetone. Imidizations have also been run by suspending the maleic anhydride copolymers in aqueous solutions. Imidizations have also been run by including anilines such as aniline in the polymerization system. One of the problems that occurs when the imidization is run in a solvent is the long reaction time required to complete the imidization step (generally about 5–12 hours at the reflux temperature of the solvent). (Jpn Kokai Tokyo Koho JP 57,125,242 and JP 57,125,141; CA 98 35543e and 35544f; JP 82,55,901; CA 97 93354j; U.S. Pat. No. 3,998,907). Usually the imidized polymer is isolated by precipitating it into a non-solvent and filtering off the polymer. This requires the recovery and purification of a large amount of solvent.

There are isolated cases known where the imidization step is carried out in a melt blending step. JP 82,100,104 (CA 97 199015g) states that rubber modified styrene-maleic anhydride copolymers can be imidized with $NH_3$ or primary amines at 80–350° C. in solution, dispersion in hydrocarbon solvents or in the molten state.

U.S. Pat. No. 4,544,682 describes the reaction of a brominated primary aliphatic amine with a copolymer of a monoalkenyl aromatic monomer and an ethylenically unsaturated anhydride in a melt blending step such as in an extruder at a temperature at or above the melting point of the copolymer.

Ger. Offen De 3,430,802 (3/6/86) (CA 104 207938y) discloses the attachment of primary amines to maleic anhydride copolymers in an extruder at temperatures of 150–300° C. with an average residence time of 0.5–30 minutes. Japanese Pat. No. 83 180,506 discloses the attachment of primary amines (toluidine) to SMA in a first extruder and then feeding the extrudate to a second vented extruder.

U.S. Pat. No. 4,591,619 discloses a process for producing an imidized copolymer by reacting a rubber modified styrene-maleic anhydride copolymer with ammonia or a primary amine in the presence of a tertiary amine at a temperature of 80 to 350° C.

SUMMARY OF THE INVENTION

As used herein, the term "4-amino-substituted polyalkylpiperidine" means a compound having the following general formula:

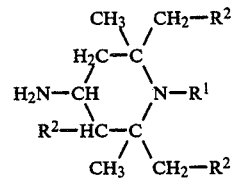

wherein $R_1$ is hydrogen, alkyl or 1 to 20 carbons, aliphatic acyl of 1 to 10 carbons or aromatic acyl of 7 to 12 carbons, and $R^2$ is hydrogen or lower alkyl of 1 to 4 carbons.

Thus, it should be clear from the foregoing definition that the 4-amino-substituted polyalkylpiperidine of the present invention may have no substituents besides hydrogen on the 4-amino substituent, as well as the other indicated substituents.

As used herein, the term "polymer" includes homopolymers, copolymers and terpolymers.

As used herein, the term "copolymer" means either a copolymer or a terpolymer.

As used herein, the term "anhydride-containing polymers or copolymers" means a polymer, copolymer or terpolymer with recurring units having the general formula:

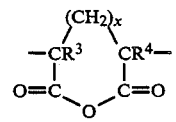

in which the units occur in the polymer backbone, on grafted side chains, as pendant units, or as combinations thereof, wherein x is 0 to 1 and $R^3$ and $R^4$ are independently hydrogen, alkyl or 1 to 6 carbons, cycloalkyl of 5 to 7 carbons, phenyl, chloride or bromine.

This invention is directed to an improved process for the attachment of at least one 4-amino-substituted polyalkylpiperidine with primary monoamino substituted $C_8$ to $C_{200}$ alkanes and/or poly(oxyalkylenes) to anhydride containing polymers or copolymers in a melt blending step where essentially all the attached 4 amino-substituted polyalkylpiperidine [and monoamino-substituted $C_8$ to $C_{200}$ alkanes or poly(oxyalkylenes)]is present in the imidized form.

The improved process for the preparation of an N-(polyalkyl-4-piperidinyl)imide containing polymer by (a) blending together a mixture of a polymer containing anhydride functions with recurring units the general formula

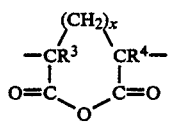

in which the units occur either pendant, in the backbone or both and a 4-amino-substituted polyalkylpiperidines wherein x is 0 or 1 and $R^3$ and 4 are independently selected from hydrogen, alkyl or 1–6 carbons, cycloalkyl or 5–7 carbons, phenyl, Cl or Br and heating said materials in the blend, either prior to or during the blending step, to the molten stage of the polymer optionally under an inert atmosphere at a temperature range of above the softening temperature but below the degradation temperature of the polymer, (b) heating said blend in said temperature range but above 180° C. for a sufficient time in order to form the N-(polyalkyl-4-piperidinyl)imide containing polymer, and (c) simultaneously and/or subsequently therewith removing all volatile by-products of the reaction to recover such product.

DESCRIPTION OF THE INVENTION

Cyclic anhydrides and primary amines react to give a product with both amide and carboxylic acid functional groups. This amide-carboxylic acid is called an amic acid. If an amic acid is heated sufficiently, further reaction occurs in which a molecular of water is lost and a ring is formed with two carbonyl groups attached to the amide nitrogen. This product is called an imide. Depending upon the substitution of the anhydride and amine, the formation of the amic acid and its conversion to imide occur under a wide range of the reaction conditions, particularly reaction temperature and duration. Temperature is usually the dominant factor. Below a certain temperature (about 100° C.) the amic acid will not convert to the imide without the aid of a coreactant. Above a certain temperature (about 175° C.–200° C.) an amic acid, once formed, will begin conversion to the imide immediately. Short reaction times, like those obtainable in a melt blender or extruder can yield mixtures of both amic acid and imide. At intermediate temperatures the reaction duration becomes important and mixtures of amic acid and imide result. In this invention it is important that essentially all the amic acid is converted over to the imide.

The imidization process of this invention may be represented by the following sequential reactions:

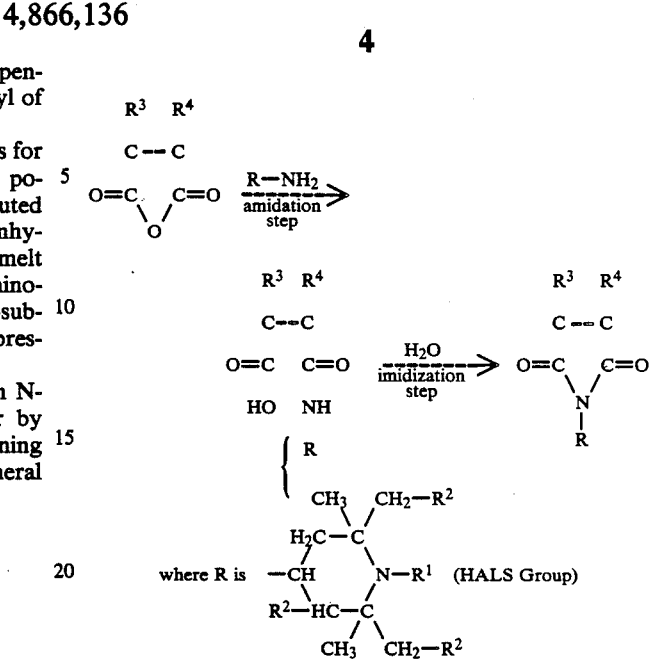

and $R^1$ is hydrogen, alkyl of 1 to 20 carbons or aliphatic acyl of 1 to 10 carbons or aromatic acyl of 7 to 12 carbons.

$R^2$ is hydrogen or lower alkyl of 1 to 4 carbons.

$R^3$ and $R^4$ are independently selected from hydrogen, alkyl of 1 to 6 carbons, cycloalkyl of 5 to 7 carbons, phenyl, chlorine or bromine.

The melt blending of the anhydride containing polymer or copolymer, preferably a maleic anhydride copolymer, and the 4-amino-substituted polyalkylpiperidine of general formula I

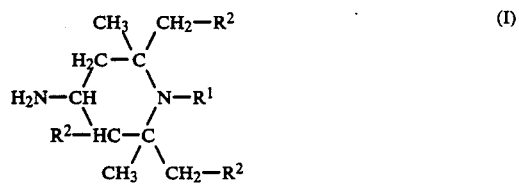

where $R_1$ and $R_2$ are as previously defined, is carried out at temperatures at or above the melting point of the anhydride copolymer but below the temperature at which the copolymer significantly degrades. The temperature will generally be between about 150° C. and about 300° C. depending upon the particular anhydride copolymer. The melting blending is continued at a sufficiently high temperature for a length of time sufficient to convert essentially all the amic acid, formed from the reaction of the amino-substituted polyalkylpiperidine, to the imidized form.

The imide group that forms from the sequential reactions has a the corresponding unsubstituted or substituted N-(polyalkyl-4-piperidinyl) group substituted on the imide nitrogen. The the corresponding unsubstituted or substituted N-(polyalkyl-4-piperidinyl group which will be referred to as the HALS group is a light stabilizing group and incorporates light stabilizing properties into the copolymer. The HALS group should be present in the copolymer in an amount sufficient to stabilize the copolymer against photooxidative degradation. Generally 0.1 to 5 weight percent of the HALS group is sufficient and in most cases 0.2 to 1.0 weight percent is sufficient. If the polymer is going to be used as a masterbatch or as a stabilizer for other polymers, copolymers, polymer alloys or blends, higher levels of the HALS group should be attached. Levels up to 58 weight percent of the HALS group are possible depending upon the composition of the anhydride copolymer.

Since water is formed in the second step of the reaction, it is preferable to have a method of removing the water as it is formed. If the reaction is carried out on a melt blending apparatus that is open to the atmosphere (preferably under a nitrogen blanket) the water vaporizes off as it is formed. However, in a non-vented extruder the water has no way to escape so it stays in the polymer under pressure and upon exiting the extruder die the polymer foams. In this case the polymer is preferably ground up, dried and re-extruded to obtain a suitable extrudate. The second extrusion can be eliminated by removing the water under vacuum using a vented extruder or in a drying oven.

The residence time in the melt blending step may vary from 30 seconds to 1 hour depending upon the reactivity of the anhydride copolymer, the melting blending temperature and the degree of mixing. Preferably the reaction is run above 200° C. and the residence time is between 1 minutes and 15 minutes and most preferably between 3 minutes and 10 minutes. At temperatures below 230° C. the reaction may stop to some degree at the amic acid stage and imidization may be incomplete. This occurs to some degree with styrene-maleic anhydride copolymers (SMA). This may be overcome by raising the temperature or increasing the residence time. The degree of imidization of the anhydride copolymer is dependent upon the mole ratio of the 4-amino-substituted polyalkylpiperidine to the initial anhydride content of the copolymer. If the mole ratio is less than 1 there will be residual anhydride in the product. If the mole ratio is greater than 1 there will be residual 4-amino-substituted polyalkylpiperidine in the reaction mixture which will have to be removed in the devolatilization step. The mole ratio of the 4-amino-substituted polyalkylpiperidine to the anhydride in the copolymer may vary from 0.01:1 to 1:1. However for economical reasons and ease of purification it is preferable to hold the mole ratio slightly below 1:1, most preferably from about 0.7:1 to about 0.95:1. This insures that all the 4-amino-substituted polyalkylpiperidine has reacted and extensive devolatilization techniques do not have to be employed to remove residual 4-amino-substituted polyalkylpiperidine from the product.

If a mixture of a 4-amino-substituted polyalkylpiperidine and a primary monoamino-substituted 8-200 carbons alkane or poly(oxyalkylene) is employed, the mole ratio of the combined amines to the anhydride in the copolymer may vary from 0.015:1 to 1:1. However, it is preferable to hold the combined mole ratio of the amines to the anhydride content of the copolymer slightly below 1:1. Most preferably, the mole ratio of the 4-amino-substituted polyalkylpiperidine to the anhydride will be 0.5:1 to about 0.9:1 and the mole ratio of the $C_8$ to $C_{200}$ amine to the anhydride will be 0.005:1 to about 0.4:1.

The pressure can be varied throughout the range of 0.5 to 300 bar. Generally the pressure will be around the partial pressure of the 4-amino-substituted polyalkylpiperidine at the reaction temperature if the reaction is not run at atmospheric pressure. The reaction can be carried out in the presence of a tertiary amine catalyst such as triethylamine but this is usually not necessary and complicates the devolatilization step.

The reaction can be carried out in any conventional melt mixing apparatus such as a plastograph, Banbury mixer, two roll mill, single or twin screw extruder, static mixer, plug flow reactor or any other method which applies sufficient heat (e.g. 175° C. to 300° C.) and shear to the ingredients to obtain a satisfactory blend. Preferably, the reaction is carried out in an extruder. The 4-amino-substituted polyalkylpiperidine and the primary monoamino-substituted 8-200 carbons alkanes or poly(oxyalkylenes) may be absorbed onto the surface of the anhydride containing polymer prior to adding it to the extruder or preferably the amine may be injected into the molten polymer under pressure in the first or second zone of the extruder. The water that forms in the reaction as well as any excess amine or other volatile compounds are removed either upon exiting the extruder or preferably by a vent near the end of the extruder which is under reduced pressure. The devolatilization step may also take place by running the extrudate through the extruder again, through a second vented extruder, or through a thin film evaporator.

Sufficient mixing must take place in the melt blending step to obtain a uniform distribution of the amines in the anhydride containing polymer or copolymer. Preferably, this is accomplished by metering the amine(s) into the molten polymer in the first or second zone of an extruder at a temperature above the softening point of the polymer. Since the imidization of the anhydride containing polymer or copolymer normally raises the softening point of the polymer, it is preferable to run the reaction above the softening point of the product as well. Since the hindered amines rapidly react with oxygen at elevated temperatures, the addition of the amine, the reaction and the cooling and isolation of the product should be carried out in an inert atmosphere, e.g., nitrogen, argon, helium, etc. to prevent degradation or discoloration of the product. Preferably, the reaction is run continuously by continuously feeding the anhydride polymer or copolymer into the melting zone of an extruder where the 4-amino-substituted polyalkylpiperidine or its mixture with the 8-200 carbons amines is continuously injected into the molten polymer in the proper mole ratio and the uniform mixture is conveyed down the extruder at a temperature sufficient to imizide all the amine for a length of time sufficient to convert any residual amic acid to imide, past a vent under reduced pressure where all the water formed as well as any other volatile components are continuously removed and the product continuously flows out of a die head, is cooled and pelletized. The reactions may be monitored by the water evolution (vented extruder) or by infrared spectroscopy of chloroform solutions of the product, following the conversion of the anhydride band around 1780 cm$^{-1}$ to an imide band at 1680 cm$^{-1}$. Thus, it is quite easy to monitor the process and manipulate the process variables to obtain essentially complete imidization. The optimum reaction temperatures and residence times vary with the particular anhydride copolymer and melt processing equipment.

When the reaction is carried out in a mixer or on a roll mill under an inert atmosphere, the modified polymer is cooled under an inert atmosphere, ground up in a grinder and dried in an oven at elevated temperatures, preferably under vacuum or an inert atmosphere. When the reaction is carried out in an extruder, the extrudate is cooled, either by an inert gas or by a cooling bath, dried if necessary, pelletized or ground up and, if necessary, dried in an oven. If the hot polymers are exposed to the air they discolor quite readily.

Since 4-amino-2,2,2,6-tetramethylpiperidine and its lower alkyl 1-substituted derivatives are quite volatile, it is preferable to run the melt blending with these amines in an extruder to minimize loss of the starting amines through volatilization and it is most preferable to inject these amines into the molten polymer under pressure along the extruder barrel rather than adding them through the hopper.

If the anhydride containing polymer or copolymer contains a high percentage of anhydride and most of the anhydride is to be imidized in an extrusion step it may be advantageous to attach the amines of this process in a series of extrusions instead of all in one step.

It is also within the scope of this invention that the anhydride polymers or copolymers may be partially imidized with other functional amines or hydrazides which will add advantageous properties to the polymers or copolymers. For example, reaction of the anhydride polymers or copolymers either before, after or during the attachment of the 4-amino-substituted polyalkylpiperidine with trialkoxysilylalkylamines such as aminomethyltrimethoxysilane, 3-aminopropyltriethyoxysilane or 3-aminopropyltriethoxysilane or 3-aminopropyltris (n-propyloxy)silane (see U.S. Pat. No. 3,755,354) will enhance the ability of the polymer or copolymer system to accept filers. Likewise, reaction of chlorinated or brominated primary amines or hydrazides will contribute flame retardant properties to the polymers or copolymers. Antistatic properties can be introduced in a similar manner. For example, the anhydride copolymers may be partially reacted with 3-dimethylaminopropylamine, to form the 3-dimethylaminopropylimide and then in a subsequent step the dimethylaminopropyl group may be quaternized with an alkyl halide such as methyl iodide (U.S. Pat. No. 3,555,001).

A particularly preferred embodiment of this invention is to partially imidize the anhydride containing polymer or copolymer with a medium or high molecular weight primary monoamino-substituted alkane or poly(oxyalkylene), either before, after or during the attachment of the 4-amino-substituted polyalkylpiperidine. The attachment of such supplementary amines to the copolymers lowers the Tg of the polymeric composition allowing lower processing temperatures and energy requirements. In addition, the attachment of such supplementary amines increases the compatibility of the polymer bound hindered amine light stabilizers produced in the invention with various polymeric compositions such as polyolefins. For example, the attachment of primary monoamino-substituted 8-200 carbons alkanes or poly(oxyalkylenes) increases the compatibility of the power bound hindered amine light stabilizers in polymeric compositions derived from polyolefins such as ethylene polymers and copolymers. Particularly preferred are the mono-amino-terminated poly(oxyalkylenes) of molecular weight 250-2500 (for example mono-amino-terminated block copolymers of ethylene oxide and propylene oxide sold commercially under the trade name Jeffamine ™, products of Texaco Chemical Company). Useful primary alkylamines are for, example, n-octyl, t-octyl, dodecyl, undecyl, tetradecyl, hexadecyl and octadecylamines.

These compositions derived from the imidization of anhydride containing polymers or copolymers, preferably maleic anhydride copolymers, by a combination of a 4-amino-substituted polyalkylpiperidine and 8-200 carbons mono primary alkylamines or mono amine-terminated poly(oxyalkylenes) or mixtures thereof, have lower Tg's, process easier, and are more compatible with other polymeric compositions such as polyolefins than the corresponding anhydride containing polymers imidized with the 4-amino-substituted polyalkylpiperidine alone. The large alkyl substituent on the imide may in some cases also contribute plasticizing, lubricating or mold release properties or combinations thereof to the ultimate polymeric compositions to be stabilized. Generally, the polymer bound hindered amine light stabilizers produced by this invention can be processed at lower temperatures if the anhydride portion of the starting polymer or copolymer is partially imidized with one of the above higher molecular weight mono primary alkyl amines or poly(oxyalkylene)amines and the greater the partial imidization with these amines and/or the greater the size of the alkyl or poly(oxyalkylene) group the more the processing temperature may be descreased. The partial imidization of the anhydride containing polymer or copolymer with a mono-amine-terminated Jeffamine ™ has a beneficial effect on the compatibility and mold release properties of a maleic anhydride copolymer imidized with a 4-amino-substituted polyalkylpiperidine. Preferably 15-95% of the anhydride content of the copolymer should be imidized with the 4-amino-substituted polyalkylpiperidine and 5-85% of the anhydride content imidized with ancillary mono primary alkyl or poly(oxyalkylene)amines.

It is also within the scope of this invention that the amines, either the 4-amino-substituted polyalkylpiperidine, the ancillary amines or both may be preblended with the anhydride containing copolymer prior to the melt blending step. The preblending step may be carried out neat, in solution or in the presence of an inert polymer. An especially preferred method is to add the amine(s) to a pulverized grade of the anhydride copolymer in a twin shell blender to obtain uniform distribution of the amine(s) on the anhydride copolymer. The preblending step may or may not result in reaction of the amine(s) with the anhydride to form the corresponding ammonium salts or amic acids. If the mixing is carried out in a solvent, the majority of the solvent is removed before proceeding to the melt processing step. If partial or no reaction occurred during the preblending step, the unreacted components will react to first form amic acid(s) and then will subsequently cyclize to the imide structure(s) with the evolution of water. If reaction occurred during the preblending step, the preformed salts or amic acids will cyclize to the desired imides during the melt processing step.

The process of this invention can be practiced in the presence of inert polymers such as HIPS, ABS, MBS, ASA, polystyrene, polyolefins, various copolymers of polystyrene and rubbery materials, PPO, PPE and various combinations thereof.

Starting Materials

The process of this invention can be conducted using various hindered amines containing primary amino substituents which react with the anhydride containing polymers or copolymers. A non-limiting list of these includes:
4-amino-2,2,6,6-tetramethylpiperidine
4-amino-1,2,2,6,6-pentamethylpiperidine
4-amino-1-butyl-2,2,6,6-tetramethylpiperidine 4-amino-2,6-diethyl-2,3,6-trimethylpiperidine
4-amino-1-octyl-2,2,6,6-tetramethylpiperidine
4-amino-1-dodecyl-2,2,6,6-tetramethylpiperidine
4-amino-2,6-diethyl-1,2,3,6-tetramethylpiperidine
4-amino-1-ethyl-2,2,6,6-tetramethylpiperidine
4-amino-1-acetyl-2,2,6,6-tetramethylpiperidine Examples of supplementary 8–200 carbons amines include the following non-limiting list of primary amines: n-octylamine, nonylamine, decylamine, undecylamine, dodecylamine, tridecylamine, tetradecylamine, hexadecylamine, octadecylamine and Jeffamines TM M-300, M-360 and M-600. The Jeffamines are products of Texaco Chemical Co. M-300 and M-600 are predominantly poly(prolylene oxide) of molecular weights 300 and 600 respectively containing one terminal amino functionality. M-360 is a mixed polyethylene oxide polypropylene oxide polymer with a ratio of two moles of propylene oxide to 3 moles of ethylene oxide. It has an approximate molecular weight of 360 and one terminal amino functionality.

Anhydride Containing Polymers and Copolymers

In general, any polymer or copolymer containing pendant cyclic anhydride groups, either on the polymer backbone or grafted side chains, is suitable for attachment of the amino substituted polyalkylpiperidine to form the polymer bound hindered amine light stabilizers. Due to cost and ease of preparation, the anhydride containing polymers are preferably polymers or copolymers of maleic anhydride.

The polymer bound stabilizers are prepared in a melt blending step from anhydride polymers or copolymers with recurring units selected from

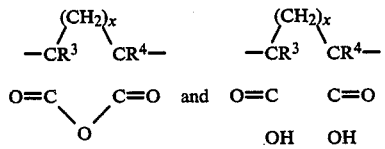

in which the units occur either in the polymer backbone, or as pendant units, or both and 4-amino-substituted polyalkylpiperidines, wherein x is 0 to 1 and $R^3$ and $R^4$ are as previously defined.

Suitable anhydride containing copolymers useful for use in this invention include but are not limited to: (a) styrene-maleic anhydride copolymers; (b) alternating copolymers of maleic anhydride and alpha-olefins; (c) copolymers of alkyl vinyl ethers and maleic anhydride; (d) maleic anhydride modified polyolefins; (e) maleic anhydride adducts of hydrogenated polymers or copolymers; (f) maleic anhydride adducts of EPDM; and other anhydride copolymers.

(a) Styrene-maleic anhydride copolymers

These copolymers are a general class of compounds of the alternating copolymers of styrene and maleic anhydride, or the non-equimolar copolymers containing less than about 50 mole percent of the anhydride monomer. The styrene may be replaced in whole or in part by other vinylaromatic monomers such as alpha-methylstyrene, nuclear methylstyrenes, ethylstyrene, isopropylstyrene, t-butylstyrene, chlorostyrenes, dichlorostyrenes, bromostyrenes, dibromostyrenes, vinylnaphthalene and the like. Similarly, the maleic anhydride can be replaced in whole or in part by another alpha, beta - unsaturated cyclic dicarboxlic acid anhydride such as itaconic, aconitic, citraconic, mesaconic, chloromaleic, bromomaleic, dichloromaleic, dibromomaleic, phenylmaleic and the like. The preferred alpha, beta —unsaturated cyclic anhydride is maleic anhydride. The copolymer may also contain a termonomer such as a 1-3 carbons alkyl acrylate or methacrylate, acrylonitrile, methacrylonitrile, acrylamide, methacrylamide, acrylic acid or methacrylic acid.

Suitable copolymers may be prepared by any of the several methods available for the preparation of styrene-maleic anhydride copolymers or they may be purchased commercially. Non-equimolar copolymers may be prepared by solution polymerization directly from the respective monomers by the incremental addition of the reactive monomer as taught by U.S. Pat. No. 3,971,393; by a continuous recycle polymerization process such as described in U.S. Pat. Nos. 2,769,804 and 2,989,517; by the suspension polymerization process described in U.S. Pat. No. 3,509,110 or by numerous known variations.

Also suitable are the rubber-modified copolymers where 5 to 40 percent by weight of one of the known elastomers has been incorporated into the vinylaromatic-alpha, beta —unsaturated dicarboxylic acid anhydride copolymer. The elastomers may be incorporated into the anhydride copolymers by blending, mixing or copolymerizing the monomers in the presence of the rubber.

Suitable rubbers, or elastomers, include conjugated 1,3-diene rubbers, styrene-diene copolymer rubbers, acrylonitrile-diene copolymer rubbers, ethylene-propylene copolymer rubbers, ethylene-propylene-diene terpolymer rubbers, acrylate-diene copolymer rubbers, and mixtures thereof.

Preferred rubbers are diene rubbers such as homopolymers of conjugated dienes such as butadiene, isoprene, chloroprene, and piperylene and copolymers of such dienes with up to 50 mole percent of one or more copolymerizable mono-ethylenically unsaturated monomers, such as styrene, substituted styrenes, acrylonitrile, methacrylonitrile and isobutylene.

Preferably, the elastomers are incorporated into the monomer mixture prior to polymerization using, for example, the method of U.S. Pat. No. 4,097,551 or U.S. Pat. No. 4,486,570 in which a mixture of at least two rubbery additives are present during the polymerization.

Particularly suitable for use are the non-equimolar copolymers of styrene and maleic anhydride designated Dylark TM copolymers, commercially available from ARCO Chemical Company, division of Atlantic Richfield Company. Suitable Dylark TM copolymers include those of the 200 series and the 300 series and Dylark TM 600 and 700. Those copolymers designated Dylark TM 250, Dylark TM 350 and Dylark TM 700 are impact modified and are especially useful.

The SMA TM resins are low molecular weight styrene-maleic anhydride copolymers (MW 700-1900) and are also useful in this invention. The low molecular weight SMA resins SMA TM 1000, 2000 and 3000 available from ARCO are also useful in this invention.

Also suitable are the styrene-maleic anhydride copolymers ro rubber modified styrene-maleic anhydride copolymers were a portion of the maleic anhydride groups are converted to maleimide groups or N-substituted maleimide groups. The partially imidized copolymers can be prepared by treating the SMA polymer with a primary amine in a post polymerization step as described in U.S. Pat. No. 3,998,907 or during the polymerization as described in U.S. Pat. No. 4,381,373.

The molar ratio of the amine to the maleic anhydride in the copolymer should be less than 0.8 to allow attachment of the 4-amino-substituted polyalkylpiperidines. The formation of the maleimide groups that don't contain stabilizer groups may be formed before, during or after the formation of the maleimide groups containing stabilizer groups. Suitable amines for this purpose are ammonia, primary alkyl amines and primary aryl amines. Long chain primary alkyl amines will beneficially aid in flow properties of the system while primary aryl amines will increase the thermal stability and heat distortion properties of the system. Aniline is the preferred aromatic amine for increasing the thermal stability of the polymer system. Brominated or chlorinated primary amines will increase the fire retardancy of the system.

The SMA copolymer may optionally contain a termonomer such as a 1–3 carbons alkyl acrylate or methacrylate, acylonitrile, methacrylonitrile, acrylamide, methacrylamide, acrylic acid or methacrylic acid. Rubber modified terpolymers of styrene, maleic anhydride and alkyl (1–3) methacrylates or described in U.S. Pat. No. 4,341,695. Incorporation of the methacrylate comonomer at specific levels (2 to 20% by weight) increases the heat distortion temperature of the polymer, raises the tensile strength and increases the gloss of the rubber-modified polymer. The polymeric composition is conveniently prepared by dissolving the rubber in a solution of the monoalkenyl aromatic component and the methacrylate ester in a suitable solvent and then polymerizing the solution with the anhydride component in the manner described in, for example, U.S. Pat. Nos. 2,971,939, 3,336,267 and 3,919,354.

The Cadon TM resins (Monsanto Chemical Company) are a commercial series of styrene-maleic anhydride polymer alloys with ABS. Rubber-modified versions are also available and are also suitable for this invention.

Also suitable are the rubber modified styrene maleic anhydride resins described in U.S. Pat. No. 4,522,983 where a minor amount of a nuclear substituted methylstyrene is included in the composition to increase the impact strength of the composition.

The styrene-maleic anhydride polymers may be further modified by copolymerizing the monomers in the presence of other monomers. In addition to the acrylates, methacrylates, acrylonitrile and methacrylonitrile previously mentioned, other suitable monomers include the ethlenically unsaturated carboxylic acids, preferably acrylic and methacrylic acids, acrylamide and methacrylamide, dialkylamino alkyl (1-6 carbons) acrylates or methacrylates such as dimethylaminoethyl acrylate or methacrylate, and vinyl esters derived from saturated carboxylic acids of 2 to 22 carbon atoms such as vinyl acetate or vinyl propionate.

Further modification of the styrene-maleic anhydride copolymers can be accomplished by carrying out the copolymerization in the presence of crosslinking monomers having two or more ethylenically unsaturated double bonds such as divinylbenzene, 1,4-butadiene, divinyl ether, ethylene glycol dimethacrylate, butanediol dimethacrylate, triallyl cyanurate and similar type compounds. The crosslinking monomers are employed in amounts of from 0.01 to 5, preferable from 0.1 to 2 mole percent based on maleic anhydride.

(b) Alternating copolymers of maleic anhydride and alpha-olefins

These are exemplified by U.S. Pat. Nos. 3,553,177, 3,560,455, 3,560,456 and 3,560,457. Each of these patents describes a copolymer of maleic anhydride with a specific alpha-olefin such as 12-30 carbons alpha-olefins. the copolymers of 6-10 carbons alpha-olefins are known as shown by U.S. Pat. No. 3,488,311. Terpolymers of maleic anhydride and at least one lower alpha-olefin and at least one higher alpha-olefin are also known, as shown by Canadian Pat. No. 1,180,497.

The alternating copolymers may be prepared by conventional polymerization processes including those described in U.S. Pat. Nos. 3,553,177, 3,560,455, 3,560,456, 3,560,457 and 3,488,311. PA-18 is an example of a commercially available alternating copolymer of maleic anhydride and octadecene-1 (product of the Chevron Chemical Company).

Also suitable for this invention are the terpolymers disclosed in U.S. Pat. Nos. 4,522,992 and 3,723,375. These are basically terpolymers of cyclic alpha, beta —unsaturated dicarboxylic acid anhydrides, aromatic mono-alkenyl monomers and higher 1-alkenes. Preferably they are terpolymers of styrene, maleic anhydride and alpha-olefins having 10 or more carbon atoms. Both pure alkenes and mixed alkenes can be utilized in preparing the terpolymers.

(c) Copolymers of alkyl vinyl ethers and maleic anhydride

These copolymers are readily prepared in bulk or solution using free radical initiators (e.g., lauroyl peroxide) (British Pat. No. 1,117,515). Low, medium and high molecular weight grades are commercially available. Commercial grades include the Gantrez TM resins (General Aniline and Film). Suitable alkyl vinyl ethers for copolymerization include methyl, ethyl, propyl, isopropyl, n-butyl, isobutyl, amyl, isoamyl, hexyl, heptyl, octyl, 2-ethylhexyl, nonyl, decyl, dodecyl, hexadecyl and octadecyl vinyl ethers.

(d) Maleic anhydride modified polyolefins

These polymers have the general following formula:

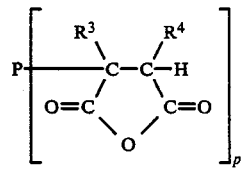

where P- represents an olefin polymer residue which is based on a preponderance of ethylene, proyplene or 1-butene, and having a valence of p and $R^3$ and $R^4$ are as previously defined. It can be either a high or low density polyethylene residue, a polypropylene residue or a residue of a copolymer of ethylene with 1-butene, a residue of a copolymer of ethylene and propylene, a residue of a propylene-butene copolymer or a residue of such a propylene copolymer with an olefin having up to about six carbon atoms.

The maleic anhydride-modified polyolefins are materials containing about 0.2 to 9% by weight of combined maleic anhydride, preferably about 2 to 5%. One embodiment of these materials is a commercially available product, sold under the trademark "Hercoprime TM " by Hercules Incorporated. Polyethylene or polypropylene modified with maleic anhydride is available commercially from Enron Chemical Co. under the trademark "Plexar TM ". Any polymer or copolymer of ethylene, propylene, or 1-butene can be modified via the maleic anhydride moiety to form the substrate molecule, including polyethylene, polypropylene, ethylene-propylene copolymer, propylenebutene-1 copolymer, or butene-1-ethylene copolymer. The most frequently encountered and the preferred maleic anhydride modified polyolefin is that based on polypropylene.

The preparation of maleic anhydride modified polypropylene is described in U.S. Pat. No. 3,483,276. Briefly, the preparation consists of exposing the olefin polymer to a material or condition which will induce the formation of active, free radical sites thereon with which maleic anhydride can react. Active centers can be induced, e.g., by subjecting the polymer to the action of high energy ionizing radiation such as gamma rays, X-rays, or high speed electrons; by contacting it, either as a solid or a solution in a solvent, with a free radical producing material such as dibenzoyl peroxide, dilauroyl peroxide, dicumyl peroxide or t-butyl perbenzoate; or by simply milling it in the presence of air. The preferred method is the reaction of the polyolefin with maleic anhydride in solvent solution in the presence of a free radical initiator.

The graft modification of EPDM by maleic anhydride in the presence of dicumyl peroxide and benzoyl peroxide is described by DeVito and co-workers (G. DeVito, N. Lanzetta, G. Maglio, M. Malinconico, P. Musta, R. Palumbo, J. Polym. Sci., Polym. Chem, Ed., 22, pp 1335–47 (1984)).

U.S. Pat. No. 4,506,056 describes a process for grafting maleic anhydride onto molten polymers or copolymers using a free radical catalyst in which crosslinking or degradation of the polymers is controlled or eliminated in the presence of scavengers which inhibit the homopolymerization of maleic anhydride.

(e) Maleic anhydride adducts of hydrogenated polymers
or copolymers

These are polymeric products containing pendant succinic anhydride groups which are formed by reacting maleic anhydride with hydrogenated polymers of conjugated dienes or hydrogenated copolymers of conjugated dienes and vinyl aromatic hydrocarbons containing a residual unsaturation level of from 0.5 to 20 percent of their original unsaturation level prior to hydrogenation. The reaction, which is conducted by heating a mixture of the maleic anhydride and hydrogenated polymer or copolymer containing residual unsaturation, proceeds by means of a reaction mechanism referred to as an "ENE" type reaction. The maleic anhydride adds to the unsaturation of the polymer to form the polymer product containing the pendant succinic anhydride groups. This polymer, by virtue of the pendant anhydride groups, can be reacted with amine substituted polyalkylpiperidines in a melt blending process to form the polymer bound hindered amine light stabilizers of this invention.

The amounts of maleic anhydride employed in the reaction can vary considerably depending on the specific nature of the hydrogenated polymer and the properties desired in the final product. In general, the amount of maleic anhydride employed may range from 0.1 to about 25 percent by weight based on total weight of maleic anhydride and hydrogenated polymer with a preferred amount being from 0.2 to 5 percent by weight.

Various polymers of conjugated dienes and copolymers of conjugated dienes and vinyl aromatic hydrocarbons may be hydrogenated for use in preparing the maleic anhydride adduct component of the compositions of the invention. Polymers of conjugated dienes which may be hydrogenated include polymers derived from one or more conjugated diene monomers. Thus, polymers derived from a single conjugated diene such as 1,3-butadiene (i.e., a homopolymer) or polymers derived from two or more conjugated dienes such as, for example, 1,3-butadiene and isoprene or 1,3-butadiene and 1,3-pentadiene (i.e., a copolymer) and the like may be utilized. Copolymers which may be hydrogenated include random copolymers of conjugated dienes and vinyl aromatic hydrocarbons and block copolymers of conjugated dienes and vinyl aromatic hydrocarbons which exhibit elastomeric properties.

(f) Maleic anhydride adducts of EPDM

These polymers are prepared by the thermal addition of maleic anhydride to elastomeric copolymers of ethylene and propylene which have a substantially saturated hydrocarbon backbone chain and unsaturated hydrocarbon side-chains. The preparation of these adducts is described in U.S. Pat. 3,884,882.

(g) Other anhydride copolymers

Examples of these copolymers are as follows:
(1) vinyl acetate-maleic anhydride copolymer
(2) ethylene-vinyl acetate-maleic anhydride terpolymer
(3) isobutylene-maleic anydride copolymer
(4) graft polyols containing styrene-maleic anhydride copolymer in the grafted chain
(5) styrene-maleic anhydride-2,4,6-tribromophenyl acrylate terpolymer
(6) maleic anhydride-divinylbenzene-styrene terpolymer
(7) ethylene-maleic anhydride-styrene graft copolymer
(8) methyl methacrylate-maleic anhydride copolymers
(9) butyl methacrylate-maleic anhydride-styrene terpolymer
(10) ethylene-maleic anhydride copolymers (Monsanto)

Other suitable maleic anhydride copolymers include the terpolymers of anhydrides, aromatic mono-alkenyl monomers and higher 1-alkenes described in U.S. Pat. No. 4,522,992, the tribromophenyl acrylate-epichlorohydrin-maleic anhydride-styrene copolymer described in U.S. Pat. No. 4,108,943, and the methyl methacrylate-maleic anhydride-styrene copolymers disclosed in Japanese Pat. No. 59/221,314 and 59/221,315 (CA102: 150317x and 150318y), divinyl ether-maleic anhydride copolymers from Adica Labs (Pivan), a polybutadiene-polystyrene-maleic anhydride terpolymer referred to as Ricon TM 184/MA, a product of Colorado Chemical Specialties, Inc., and ethylene/vinyl acetate copolymer grafted with maleic anhydride such as Modic E 310 K a product of Mitsubishi Chemical Industries Co.

Anhydride polymers containing glutaric anhydride units can also be used in this invention. Such polymeric anhydrides are available from polymers and copolymers of acrylic and methacrylic acid by heating under dehydrating conditions, with or without a catalyst (European Pat. No. 76,691).

In addition poly(maleic anhydride) such as Belcene, a product of Ciba-Geigy, is also suitable in this invention.

EXAMPLES

The following maleic anhydric copolymers were used in the preparation of the polymer bound stabilizers of the examples.

Cadon TM resins are a commercial series of styrene-maleic anhydride polymer alloys with ABS and were obtained from the Monsanto Chemical Co.

PA-18 is a copolymer of 1-octadecene and maleic anhydride and was obtained from Chevron Chemical Co. It has a molecular weight of about 50,000.

The Dylark TM resins are high molecular weight non-equimolar copolymers of styrene and maleic anhydride commercially available from Arco Chemical Company. Dylark TM 250 and 700 are rubber modified while Dylark TM 232 is not. Dylark TM 250 is prepared by polymerizing about 92% by weight styrene monomer and about 8% by weight maleic anhydride, in the presence of about 18 parts by weight Stereon TM Rubber 720 (Firestone Synthetic Rubber and Latex Co.) per 100 parts of combined styrene and maleic anhydride.

4-Amino-2,2,6,6-tetramethylpiperidine and dodecylamine were purchased from Aldrich Chemical Co. Jeffamine TM M-360 and M-600 were obtained from the Texaco Chemical Co. The HIPS used was Dow Styron 489W. The poly(phenylene oxide) was purchased from Aldrich Chemical Co. The polypropylene was Profax 6501 purchased from Himont.

EXAMPLE I

Attachment of 4-Amino-2,2,6,6-tetramethylpiperidine to

Maleic Anhydride Copolymers in a Plastograph

A. Dylark TM 232 (200 grams) was melted in a Brabender Prep Center Mixer (R.E.E.G.) at 200° C. under a nitrogen atmosphere while mixing at a speed of 30 rpm. To the molten polymer were added 16 grams of 4-amino-2,2,6,6-tetramethylpiperidine dropwise over approximately 5 minutes. The temperature of the molten polymer rose to 220° C. during the addition. The molten polymer was mixed an additional 5 minutes after the addition was complete. The mixing temperature was approximately 215° C. ±3° C. The hot polymer was removed from the mixer, cooled and ground up in a grinder. A 0.5 gram sample of the modified polymer was stirred with 20 ml of warm chloroform for 1 hour. The sample was not completely soluble and formed a viscous jelly with the chloroform. An infrared scan of the jelly indicated that an imide band had formed at 1680 cm$^{-1}$ and the residual anhydride band at 1770 cm$^{-1}$ had decreased in intensity and was about 2/3 as intense as the imide band.

B. The reaction was repeated only this time the Dylark TM 232 was heated to 220° C. prior to the addition of the 4-amino-2,2,6,6-tetramethylpiperidine. The temperature of the molten polymer rose to 228° C. during the addition and held around 227° C. ±3° C. during the 5 minute mixing period. During the addition there was some puffs of white vapor when the amine hit the hot polymer indicating some volatilization of the volatile amine was occurring before it could react. The 0.5 gram sample of the ground up product dissolved to a greater extent in the warm chloroform to give a viscous solution. An infrared scan of the solution again showed that the residual anhydride peak was only about ⅔ as intense as the imide peak.

C. The reaction was repeated a third time only the Dylark TM 232 was heated to 235° C. prior to the addition of the amine. The temperature of the molten polymer rose to 242° C. during the addition and held around 245° C. during the mixing period. There was more obvious vaporization of the amine during the addition at this temperature. The 0.5 gram sample of the ground up product dissolved almost completely in the warm chloroform to give a slightly viscous solution. Due to the volatilization of some of the amine during the addition, the residual anhydride peak was almost as intense as the imide peak that formed.

D. The reaction was repeated a fourth time only the Dylark TM 232 was heated to 250° C. prior to the addition of the amine. The temperature of the molten polymer rose to 256° C. during the addition and held around 256° C. during the mixing period. More volatilization of the amine occurred at this temperature and more water vapor evolved during the mixed period. The 0.5 gram sample of the ground up product dissolved completely in the warm chloroform to give a clear non-viscous solution. Due to the volatilization of some of the amine during the addition, the residual anhydride peak was slightly greater than the imide peak that formed.

EXAMPLE II

Attachment of 4-Amino-2,2,6,6-tetramethylpiperidine to

Dylark TM 232 in an Extruder

Samples of 40 grams of 4-amino-2,2,6,6-tetramethylpiperidine were absorbed onto 500 grams of Dylark TM 232 by adding the amine to the Dylark pellets in a glass jar and rotating the jar for several minutes and then allowing the mixture to stand overnight. The next morning the liquid coated pellets were added to a Brabender Prep Center Extruder and extruded at a screw speed of 30 rpm.

A. In the first run the five zones of the extruder were set at 220° C. The polymer melt had a temperature of 212° C. at the die heat and the maximum pressure built up was 320 psi. Since there wasn't a vent on the extruder the extrudate was partially foamed by the water vapor generated. The extrudate was pale yellow in color. it was cooled and ground up in a grinder. A 0.5 gram sample of the modified polymer was stirred with 20 ml of warm chloroform for 1 hour. The product did not completely dissolve in the chloroform and formed a viscous gel. An infrared scan of the gel indicated that an imide band had formed at 1680 cm$^{-1}$ and the residual anhydride band at 1770-1780 cm$^{-1}$ was about ½ as intense as the imide band.

The modified polymer was re-extruded a second time at the same temperature but there wasn't any noticeable change in the solubility of the product in chloroform or of the relative intensities of the carbonyl bands in the IR scans.

B. The reaction was repeated on another batch of Dylark TM 232 containing the amine absorbed on the surface only this time all the heating zones were set at 240° C. The polymer melt had a temperature of 232° C.

at the die head and the maximum pressure built up was 220 psi. The foamed extrudate was lighter yellow in color. The 0.5 gram sample of the ground up product dissolved to a greater extent in the chloroform to give a cloudy viscous solution. An IR scan of the viscous solution was similar to the IR scans of the first run. The modified polymer was re-extruded a second time at 240° C. The 0.5 gram sample of the ground up product almost completely dissolved to give a clear slightly viscous solution. There was no obvious difference in the IR scans from the first extrusion.

C. The reaction was repeated on a third batch of Dylark TM 232 containing the amine absorbed on the surface, only this time all the heating zones were set at 260° C. The polymer melt had a temperature of 252° C. at the die head and the maximum pressure built up was 270 psi. The highly foamed extrudate was white in color. The 0.5 gram sample of the ground up product dissolved completely in the 20 ml of warm chloroform to give a clear non-viscous solution. An IR scan of the solution was similar to the IR scan of the run made at 220° C. Thus, there was no loss of amine upon extruding at the higher temperature as there was in Example I using the Plastograph. The modified polymer was re-extruded a second time. The extrudate was no longer foamed and only contained a few air bubbles. Again the 0.5 gram sample of the product dissolved completely to give a clear non-viscous solution.

EXAMPLE III

Attachment of 4-Amino-2,2,6,6-tetramethylpiperidine to

Dylark TM 250 in an Extruder

Samples of 20 grams of 4-amino-2,2,6,6-tetramethylpiperidine absorbed on 500 grams of Dylark TM 250 were prepared similar to the Dylark TM 232 samples prepared in Example II. One sample containing 40 grams of the amine on Dylkark TM 250 was also prepared but the amine did not completely absorb on the pellets and a few grams of amine remained on the sides of the jar.

The extrusions were carried out similar to the extrusions carried out in Example II. The samples containing 20 grams of the amine were extruded at A) 220° C. (melt temperature 212° C. —max. pressure 320 psi), B) 240° C. (melt temperature 231° C. —max. pressure 230 psi) and 260° C. (melt temperature 251° C. —max. pressure 160 psi). The extrudates were cooled, ground up and re-extruded at the same temperature. The results were similar to the results in Example I. Since Dykark TM 250 is a rubber modified styrene-maleic anhydride copolymer, none of the chloroform solutions were clear. The solutions of the modified polymer made at 220° C. were cloudy and viscous. The IR scan of the gel indicated an imide band had formed at 1680 $cm^{-1}$. The chloroform solution of the modified polymer extruded at 240° C. was a cloudy viscous solution containing a few insoluble particles. An IR scan of the viscous solution showed the residual anhydride peak was slightly more intense than the imide band. The chloroform solution of the modified polymer extruded at 260° C. was a slightly cloudy non-viscous solution. An IR scan of the solution was similar to the IR scan of the sample extruded at 240° C. D) The sample containing approximately 40 grams of the amine was extruded at 260° C. (melt temperature 251° C. —max. pressure 190 psi), cooled, ground up and re-extruded at 260° C. A chloroform solution of the ground up product after the first extrusion was cloudy and non-viscous. The IR scan indicated the imide peak as about twice as intense as the residual anhydride peak.

EXAMPLE IV

Attachment of 4-Amino-2,2,6,6-tetramethylpiperidine to

Maleic Anhydride Copolymers in an Extruder

Samples of 20 grams of 4-amino-2,2,6,6-tetramethylpiperidine were absorbed on 500 grams of various maleic anhydride copolymers using the procedure described in Example I.

The extrusions were then carried out similar to the extrusions carried out in Example III.

(A) A sample of 20 grams of the amine on Dylark TM 600 was extruded at 260° C. (melt temperature 251° C. —max. pressure 120 psi). The first extrudate was blistered but not foamed. A chloroform solution (20 ml) of 0.5 gram of the ground up extrudate was cloudy but non-viscous. In the IR scan of the solution, the anhydride peak was slightly more intense than the imide band. The ground up extrudate was re-extruded at 260° C. The second extrudate was smooth and only had a few air bubbles.

(B) A sample of 20 grams of the amine on Dylark TM 700 was extruded at 260° C. (melt temperature 251° C. —max. pressure 120 psi). The first extrudate was highly blistered but not foamed. A chloroform solution (20 ml) of 0.5 gram of the ground up extrudate was cloudy but non-viscous. In the IR scan of the solution the anhydride peak was slightly more intense than the imide band. The ground up extrudate was re-extruded at 260° C. The second extrudate was smooth and only had a few air bubbles.

(C) A sample of 20 grams of the amine on Cadon TM 127 was extruded at 240° C. (melt temperature 231° C. —max. pressure 340 psi). The first extrudate was quite insoluble in chloroform. The extrudate was ground up and re-extruded at 240° C. The second extrudate contained a lot of blisters. The IR scan of the chloroform solution of the partially dissolved extrudate contained an anhydride peak at 1775 $cm^{-1}$ and weaker carbonyl peaks at 1720 $cm^{-1}$ and 1695 $cm^{-1}$ (imide band).

(D) A sample of 20 grams of the amine on Cadon #127 was extruded in a similar fashion at 260° C. (melt temperature 251° C. —max. pressure 150 psi). The ground up extrudate was not completely soluble in the warm chloroform. The IR scan of the chloroform solution contained the carbonyl peaks and the same relative intensities as in the extrusion run at 240° C.

EXAMPLE V

Attachment of 4-Amino-2,2,6,6-tetramethylpiperidine to Maleic Anhydride Copolymers in an Extruder at Use Levels Samples of 8 grams of 4-amino-2,2,6,6-tetramethylpiperidine were absorbed on 500 grams of various maleic anhydride copolymers using the procedure described in Example II. The extrusions were then carried out similar to the extrusions carried out in Example III.

(A) A sample of 8 grams of the amine on 500 grams of Dylark TM 232 was extruded at 220° C. (melt temperature 215° C. —max. pressure 400 psi). There was some bubbling of the extrudate. The middle portion of the extrudate was ground up and re-extruded at 220° C. One gram of the second extrudate was dissolved in 20 ml of warm chloroform. A clear solution was not formed. The IR scan of the chloroform solution contained a small imide band at 1680 cm$^{-1}$.

(B) A sample of 8 grams of the amine on 500 grams of Dylark TM 250 was extruded at 220° C. The middle portion of the extrudate was ground up and re-extruded at 220° C. One gram of the second extrudate was dissolved in 20 ml of warm chloroform. A clear solution was not formed. The IR scan of the chloroform solution contained a small imide band at 1680 cm$^{-1}$.

(C) A sample of 8 grams of the amine on 500 grams of Cadon TM 140 extruded at 220° C. The middle portion of the extrudate was ground up and re-extruded at 220° C. There was some blistering of the extrudate. One gram sample of the ground up extrudate was not completely soluble in 20 ml of chloroform. A distinct imide was not observable in the IR scan of the chloroform solution because the starting Cadon TM 140 has a strong carbonyl band centered at 1710 cm$^{-1}$ which masks the small imide band.

EXAMPLE VI

Attachment of 4-Amino-2,2,6,6-tetramethylpiperidine to Octadecene-Maleic Anhydride Copolymer in an Extruder A blend of 1000 grams of octadecene-maleic anhydride (PA-18) and 150 grams of 4-amino-2,2,6,6-tetramethyl-piperidine was prepared by adding the amine to the PA-18 in small portions in a polyethylene jug. The lumps that formed upon absorption of the amine onto the PA-18 were broken up in A Waring blender and added back to the polyethylene jug. The jug was shaken well to obtain uniformity and then transferred to the hopper of a Brabender Prep Center Extruder Model No. 1340 having a 1-¼ inch screw diameter with a length to diameter ratio of 25:1. A vent was attached to the barrel which was connected to a vacuum pump through a vacuum trap. The extruder had been purged with PA-18. It was operating at a screw speed of 30 rpm and the following temperature profile was employed:

| | |
|---|---|
| Zone One | 220° C. |
| Zone Two | 220° C. |
| Zone Three | 225° C. |
| Zone Four | 230° C. |
| Die | 230° C. |

The first 100 grams of extrudate were discarded. The remaining extrudate was air cooled and ground up in a Waring blender into a fine powder. During the extrusion water vapor formed both in the trap and at the die head. The extrudate was in a formed condition and could easily be crushed into a powder. A solution of 0.5 gram of the extrudate in 20 ml of chloroform was prepared and an IR scan run on the solution. The IR scan had a strong peak at 1780 cm$^{-1}$ (anhydride) a weak carbonyl peak at 1740 cm$^{-1}$ and a strong peak at 1695 cm$^{-1}$. The blend had been prepared in a ratio such that 35% of the anhydride would have been converted to the HALS substituted imide and/or amic acid.

EXAMPLE VII

Attachment of 4-amino-2,2,6,6-tetramethylpiperidine to Dylark TM 250 in the Presence of HIPS A blend of 75 grams of Dylark TM 250 and 225 grams of HIPS was prepared in a gallon jug. After the blend was shaken well to insure uniformity, 250 grams of the blend were added to a Brabender Prep Center Mixer. The blend was mixed under a nitrogen atmosphere for approximately 5 minutes at 200° C. at 20 rpm. To the molten blend was added 9.8 grams of 4-amino-2,2,6,6-tetramethylpiperidine dropwise over about 3 minutes. The molten mixture was mixed an additional 15 minutes at 200° C. under a nitrogen atmosphere and then removed as quickly as possible from the mixture and cooled in a water bath. The modified polymer was dried of superficial water and dried 4 hours at 60° C. in an oven. The polymer was then ground up in a grinder and re-dried overnight at 60° C. The ground up product was partially dissolved in chloroform and an IR scan run on the chloroform soluble material. The IR scan indicated that about 90% of the anhydride had been converted to the imide (strong band at 1680 cm$^{-1}$) or the amic acid (weak band at 1660 cm$^{-1}$).

EXAMPLE VIII

Stabilization of a Poly(phenylene oxide) Blend with a Polymer Bound Hindered Amine Light Stabilizer A poly(phenylene oxide) blend was prepared by weighing 75 grams of the masterbatch of HIPS and the modified Dylark TM 250 from Example VII, 75 grams additional HIPS, 150 grams poly(phenylene oxide) and 3 grams tridecyl phosphite into a gallon jug and shaking it until a uniform mixture was obtained. The bend was extruded through a Brabender Prep Center Extruder at 260° C. The extrudate was cooled in a water bath and dried. The extrudate was smooth but contained a few air bubbles. The extrudate was ground up and dried overnight in an oven at 60° C. The product was permanently stabilized against photooxidative degradation and the light stabilizer did not leach out of the polymer blend when in contact with solvents or volatilize out at high temperatures.

EXAMPLE IX

Tgs of Polymer Bound Hindered Amines

The Tgs of the various polymer bound hindered amine light stabilizers were determined on a Perkin-Elmer 7 Series thermal Analysis System. The results are summarized in the following table.

| EXAMPLE # | MALEIC ANHYD. COPOLYMER | g. MA COPOLYMER | g. AMINE | REACTOR TEMP °C. | Tg OF EXTRUDATE °C. |
|---|---|---|---|---|---|
| IA | DYLARK ® 232 | 200 | 16 | 200 | 126.1 |
| IB | DYLARK ® 232 | 200 | 16 | 220 | 126.3 |
| IC | DYLARK ® 232 | 200 | 16 | 235 | 126.2 |
| ID | DYLARK ® 232 | 200 | 16 | 250 | 124.1 |
| IIA | DYLARK ® 232 | 500 | 40 | 220 | 126.5 |
| IIB | DYLARK ® 232 | 500 | 40 | 240 | 127.5 |
| IIC | DYLARK ® 232 | 500 | 40 | 260 | 124.0 |
| IIIA | DYLARK ® 250 | 500 | 20 | 220 | 128.0 |
| IIIC | DYLARK ® 250 | 500 | 20 | 260 | 124.6 |
| IIID | DYLARK ® 250 | 500 | 40 | 260 | 126.1 |

-continued

| EXAMPLE # | MALEIC ANHYD. COPOLYMER | g. MA COPOLYMER | g. AMINE | REACTOR TEMP °C. | Tg OF EXTRUDATE °C. |
|---|---|---|---|---|---|
| IVA | DYLARK ® 600 | 500 | 20 | 260 | 123.0 |
| IVB | DYLARK ® 700 | 500 | 20 | 260 | 124.8 |
| VA | DYLARK ® 232 | 500 | 8 | 220 | 121.0 |
| VB | DYLARK ® 250 | 500 | 8 | 220 | 124.3 |
| VC | CADON ® 140 | 500 | 8 | 220 | 140.2 |
| CONTROL | DYLARK ® 232 | | | | 120.6 |
| CONTROL | DYLARK ® 250 | | | | 122.7 |
| CONTROL | DYLARK ® 600 | | | | 114.0 |
| CONTROL | DYLARK ® 700 | | | | 117.9 |

Observations: In general the Tg's of the modified copolymers increased in direct proportion to the amount of amine attached under the same reaction conditions. The Tg's of the polymers modified at 260° C. were lower than those modified at lower temperatures because complete imidization occurred at 260° C. eliminating any ionic crosslinking and thereby lowering the Tg by a few degrees.

EXAMPLE X

Preparation of an Octadecene/N-(2,2,6,6-tetramethyl-4-piperidinyl)-maleimide Copolymer in Polypropylene in an Extruder A blend of 20% 4-amino-2,2,6,6-tetramethylpiperidine on PA-18 was prepared by adding the 4-amino-2,2,6,6-tetramethylpiperidine to the PA-18 in a rotating twin shell blender containing an intensifier bar. A mixture of 37 grams of the resulting PA-18 blend, 563 grams of Himont's Profax 6501 polypropylene and 1.5 grams of Irganox 1076 (a hindered phenol antioxidant of Ciba-Geigy) were dry blended in a gallon container and then extruded at 220° C. and a screw speed of 20 RPM in the Brabender Prep Scale Extruder described in Example VI. The first 100 grams of extrudate were used to purge out the extruder and were discarded. The extrudate was partially foamed due to the water evolved during the imidization. The remaining extrudate was air cooled and pelletized.

The pelletized extrudate (495 grams) was let down with an additional 1200 grams of polypyropylene and 4.2 grams of Irganox 1076. The letdown blend was shaken well to obtain uniformity and extruded at 220° C. and a screw speed of 30 RPM. The extrudate was not foamed indicating that complete imidization occurred during the first extrusion. The extrudate was cooled, the first 100 grams discarded and the remaining extrudate (1540 grams) pelletized. The concentration of the 2,2,6,6-tetramethyl-4-piperidyl group (HALS Group) in the composition was approximately 0.3% and the Irganox 1076 concentration was approximately 0.25%.

The pellets were injection molded in a Newbury 25 ton injection molding machine at 400° F. into 7-⅜"×¾"×⅛" tensile bars.

EXAMPLES XI-XIV

Imidization of Octadecene/Maleic Anhydride Copolymers with Mixtures of 4-amino-2,2,6,6-tetramethylpiperidine and Supplementary Amines in an Extruder Four blends of PA-18 and mixtures of 4-amino-2,2,6,6-tetramethylpiperidine and a supplementary amine were prepared. The 4-amino-2,2,6,6-tetramethylpiperidine was mixed with the supplementary amine (total moles amine =0.8) and added in small portions to 350 grams (1.0 mole) of PA-18 in a 1 gallon poly jug. The mixture was shaken well in the jug between each addition. After all the amine mixture was added, the blend was transferred to a Waring blender and all the lumps were ground up. The ground up portions were recombined in the jug and shaken well again to insure uniformity. See Table I for weights and moles of reagents.

The four blends were extruded on the Brabender Extruder described in Example VI at a screw speed of 30 RPM. Extrusion temperatures are listed in Table I. The samples were extruded one after the other without purging the extruder between runs. The extrudates were in a highly foamed state. The extrudates were cooled and the first 100 grams of each run were discarded to prevent cross contamination. The remaining extrudates were pelletized and used in Examples XV-XVIII.

EXAMPLES XV-XVIII

Extrusion of Propylpropylene with Polymer Bound HALS from Examples XI-XIV

Dry blends of Profax 6501 polypropylene, 0.25% Irganox 1076 antioxidant and enough of the polymer bound HALS compounds from Examples XI-XIV to provide a 1.5% concentration of the 2,2,6,6-tetramethyl-4-piperidyl group were prepared in a 1 gallon poly container and were shaken well to obtain a uniform dispersion (For composition see Table I). The blends were then extruded on the Brabender Extruder described in Example VI at a temperature of 220° C. and a screw speed of 30 RPM. The first 100 grams of extrudate were used to purge out the extruder and were discarded. The remaining extrudate was air cooled and pelletized.

The pelletized extrudates (150 g) were let down with 600 grams of additional Profax 6501 polypropylene and 1.9 grams Irganox 1076, mixed well and re-extruded at 220° C. and 30 RPM. The first 100 grams of extrudate were used to purge out the extruder and were discarded. The remaining extrudate was air cooled and pelletized. (For compositions see Table II).

The final compositions were injection molded in a Newbury 25 ton injection molding machine at 400° F. into 7-⅜"×¾"×⅛" tensile bars. Control samples containing 0.25% Irganox 1076 alone (Control 1) as well as samples containing 0.25% Irganox 106 and Tinuvin 770 (conc. 0.3% of 2,2,6,6-tetra-methyl-4-piperidyl groups) (Control 2) were also extruded twice at 220° C. and injection molded. A control sample of unadulterated and unextruded Profax 6501 was also injection molded (Control 3).

EXAMPLE XIX

Evaluation of the Polymer Bound HALS from Examples X–XIV in the Stabilization of Polypropylene The tensile bars from Examples X, XV–XVIII and Controls 1, 2 and 3 were placed in a QUV Accelerated Weathering Tester (Q Panel Company) for various exposure times. The QUV operated with an 8 hour light cycle (UV-B) at 60° C. and a 4 hour condensation cycle at 50° C. Samples were placed in the QUV and withdrawn at approximately the same time each day. Samples withdrawn from the QUV were evaluated for change in yellowing (ΔE) on a Colorgard System/05 (Pacific Scientific) colorimeter. Control samples without any UV stabilizer or additional antioxidant (Control #3) as well as extruded controls containing Irganox 1076 (Control #1) and Irganox 1076 with Tinuvin 770 (Control #2) were included in the study. The results are summarized in Table III.

After measuring the color, the tensile bars were pulled on an Instron and the % elongation determined. By comparing the % elongation of the unexposed samples with the exposed samples, the % retention of elongation was calculated for the various exposure periods. The appearance of crazing, cracking or haziness on the exposed surface was also noted. The results are summarized in Table III.

TABLE I

Imidization of Octadecene/Maleic Anhydride Copolymers with Mixtures of 4-Amino-2,2,6,6-tetramethylpiperidine and Supplementary Amines in an Extruder

| EXAMPLE # | 4-AMINO-2,2,6,6-TETRAMETHYLPIPERIDINE (grams) | (moles) | SUPPLEMENTARY AMINE (grams) | (moles) | PA-18 (grams) | (moles) | EXTRUSION TEMPERATURE (°C) | FINAL RECOVERED YIELD (grams) |
|---|---|---|---|---|---|---|---|---|
| XI | 109.4 | 0.7 | JEFFAMINE M-600 60 | 0.1 | 350 | 1.0 | 205–210 | 259 |
| XII | 93.8 | 0.6 | JEFFAMINE M-600 120 | 0.2 | 350 | 1.0 | 205–210 | 364 |
| XIII | 62.5 | 0.4 | JEFFAMINE M-360 132 | 0.4 | 350 | 1.0 | 183 | 87 |
| XIV | 62.5 | 0.4 | DODECYLAMINE 74.2 | 0.4 | 350 | 1.0 | 205–210 | 241 |

TABLE II

Extrusion of Polypropylene with Polymer Bound HALS

| EXAMPLE # | POLYMER BOUND HALS (Ex. #) | 1ST EXTRUSION POLYMER BOUND HALS (grams) | POLY-PROPYLENE (grams) | IRGANOX 1076 (grams) | APPROX. HALS CONC.* | 1ST EXTRU-DATE (grams) | 2ND EXTRUSION ADDITIONAL POLY-PROPYLENE (grams) | ADDITIONAL IRGANOX 1076 (grams) | FINAL RECOVERED (grams) | APPROX. HALS CONC.* | IRGANOX 1076 CONC. |
|---|---|---|---|---|---|---|---|---|---|---|---|
| XV | XI | 80 | 920 | 2.5 | 1.5% | 150 | 600 | 1.9 | 677 | 0.3 | 0.25 |
| XVI | XII | 100 | 900 | 2.5 | 1.5% | 150 | 600 | 1.9 | 627 | 0.3 | 0.25 |
| XVII | XIII | 84.4 | 500 | 1.7 | 1.5% | 150 | 600 | 1.9 | 608 | 0.3 | 0.25 |
| XVIII | XIV | 130 | 870 | 2.5 | 1.5% | 150 | 600 | 1.9 | 645 | 0.3 | 0.25 |
| CONTROL 1 | | | | | | | 1000 | 2.5 | 860 | 0.0 | 0.25 |
| CONTROL 2 | TINUVIN 770 | 10.0 | 1000 | 2.5 | 0.6 | 874 | 874 | 4.4 | 1530 | 0.29 | 0.6 |

*Concentration of 2,2,6,6-tetramethyl-4-piperidinyl (HALS) groups in final composition.

TABLE III

Stabilization of Polypropylene with Hindered Amine Light Stabilizers

| QUV EXPOSURE RESIN FORMULATION (SEE TABLE II) | 3 DAYS % Ret. El. | ΔE | 5 DAYS % Ret. El. | ΔE | 7 DAYS % Ret. El. | ΔE | 10 DAYS % Ret. El. | ΔE | 15 DAYS % Ret. El. | ΔE | 20 DAYS % Ret. El. | ΔE | 30 DAYS % Ret. El. | ΔE | 1ST EVIDENCE OF CRAZING OR CRACKING (DAYS) |
|---|---|---|---|---|---|---|---|---|---|---|---|---|---|---|---|
| EXAMPLE # | | | | | | | | | | | | | | | |
| X | 50 | 0.1 | 45 | 0.2 | 45 | 0.8 | 65 | 0.8 | 35 | 1.2 | 0 | 1.4 | | | 19 |
| XV | 25 | 0.1 | 19 | 0.3 | 17 | 1.3 | 40 | 0.5 | 16 | 0.6 | 0 | 1.3 | | | 22 |
| XVI | 40 | 0.1 | 50 | 0 | 25 | 1.3 | 30 | 0.7 | 15 | 1.8 | 0 | 3.4 | | | |
| XVII | 92 | 0.3 | 62 | 0.1 | 54 | 0.8 | 62 | 1.8 | 77 | 0.5 | 0 | 2.5 | | | 19 |
| XVIII | | 0 | | 0.3 | 44 | 0.5 | 60 | 0.9 | | 1.1 | 0 | 2.8 | | | 22 |
| CONTROL 1 | 56 | 0.1 | 44 | 0.9 | 11 | 1.1* | 11 | 3.2* | 0 | 2.5* | 0 | 2.6* | | | 7 |
| CONTROL 2 | 90 | 1.0 | 50 | 1.6 | 30 | 2.2 | 50 | 2.9 | 20 | 2.6 | 0 | 4.8 | | | |
| CONTROL 3 | 58 | 5.3 | 0 | 8.0 | 0 | 11.3 | 0 | 12.2 | 0 | 12.3 | 0 | | | | 7 |

*SURFACE DULLED AND CHALKY

What is claimed:

1. A process for the preparation of an N-polyalkyl-4-piperidinyl)imide polymeric product by
   (a) blending together a mixture of at least one 4-amino-substituted polyalkylpiperidine having the following general formula:

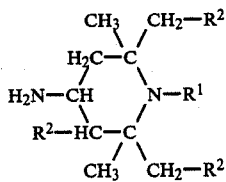

wherein $R^1$ is hydrogen, alkyl of 1 to 20 carbons, aliphatic acyl of 1 to 10 carbons or aromatic acyl of 7 to 12 carbons, and $R^2$ is hydrogen or lower alkyl of 1 to 4 carbons, and at least one polymer with recurring units having the general formula:

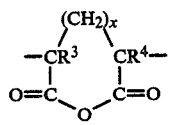

in which the units occur in the polymer backbone, on grafted side chains, as pendant units, or as combinations thereof, wherein x is 0 or 1, and $R^3$ and $R^4$ are independently hydrogen, alkyl of 1 to 6 carbons, cycloalkyl of 5 to 7 carbons, phenyl, chlorine or bromine, (b) heating the 4-amino-substituted polyalkylpiperidine and the polymer, in the absence of a solvent, either prior to or during the blending step (a), to the molten stage of the polymeric product optionally under an inert atmosphere at a temperature range of above the softening temperature but below the degradation temperature of the polymeric product, (c) heating the mixture in the temperature range but above 180° C. for a sufficient time in order to form the N-(polyalkyl-4-piperidinyl)imide polymeric product, and (d) removing all volatile by-product of the reaction simultaneously with the reaction, in a post reaction devolatilization step or a combination thereof, to recover the polymeric product.

2. A process of claim 1 where the polymer is a maleic anhydride copolymer, the reaction is carried out in an extruder, plastograph or Banbury mixer at a temperature above 150° C. and below 300° C. for a period of 30 seconds to 1 hour and the water of reaction is removed under vacuum or in a post drying step.

3. A process of claim 2 where the molar ratio of the anhydride component of the copolymer to the 4-amino-substituted polyalkylpiperidine is greater than 1:1, the reaction is carried out under an inert atmosphere in a vented extruder at a temperature of 175° C. to 300° C., the residence time in the extruder is 2 minutes to 30 minutes and the water of reaction is removed under reduced pressure through the vent in the extruder.

4. A process of claim 3 where the maleic anhydride copolymer is a styrene-maleic anhydride copolymer, the 4-amino-substituted polyalkylpiperidine is 4-amino-2,2,6,6-tetramethylpiperidine which is injected into molten copolymer in the extruder at a temperature above the softening point of the copolymer and the molten copolymer and polymeric product are conveyed through the extruder at a temperature within the range of 240° C. to 270° C.

5. A process of claim 3 where the maleic anhydride copolymer is an octadecene-maleic anhydride copolymer, the 4-amino-substituted polyalkylpiperidine is 4-amino-2,2,6,6-tetramethylpiperidine which is injected into molten copolymer in the extruder at a temperature above the softening point of the copolymer and the molten copolymer and polymeric product are conveyed through the extruder at a temperature within the range of 240° C. to 270° C.

6. A composition prepared by imidizing a portion of the anhydride content of an anhydride-containing polymer with recurring units having the general formula:

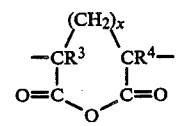

in which the units occur in the polymer backbone, on grafted side chains, as pendant units, or as combinations thereof, wherein x is 0 or 1 and $R^3$ and $R^4$ are independently hydrogen, alkyl of 1 to 6 carbons, cycloalkyl of 5 to 7 carbons, phenyl, chlorine or bromine, with a 4-amino-substituted polyalkylpiperidine having the following general formula:

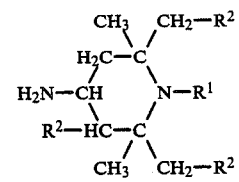

wherein $R^1$ is hydrogen, alkyl of 1 to 20 carbons, aliphatic acyl of 1 to 10 carbons or aromatic acyl of 7 to 12 carbons, and $R^2$ is hydrogen or lower alkyl of 1 to 4 carbons, and a portion of the anhydride content is imidized with a primary monoamino-substituted alkane of 8 to 200 carbons or primary monoamine-terminated poly(oxylalkylene) of 8 to 200 carbons.

7. A composition of claim 6 wherein the anhydride-containing polymer is a maleic anhydride copolymer, where 15–95% of the anhydride content of the copolymer is imidized by a 4-amino-2,2,6,6-tetramethylpiperidine and 5–85% of the anhydride content of the copolymer is imidized by the primary monoamine-terminated poly(oxyalkylene).

8. A composition of claim 7 wherein the anhydride containing polymer is an octadecene-maleic anhydride alternating copolymer and the primary monoamine-terminated poly(oxyalkylene) is a primary monoamine-terminated block copolymer of ethylene oxide and propylene oxide of molecular weight of approximately 300 to 600.

9. A composition of claim 6 wherein the anhydride-containing polymer is a maleic anhydride copolymer, where 15–95% of the anhydride content of the copolymer is imidized by 4-amino-2,2,6,6-tetramethylpiperidine and 5–85% of the anhydride content of the copolymer is imidized by a primary monoamine-terminated alkane of 8–200 carbons.

10. A composition of claim 9 where the anhydride-containing polymer is an octadecene-maleic anhydride alternating copolymer and the primary monoamineterminated alkane is dodecylamine.

11. A process for making a polymeric product by the attachment of a combination of a 4-amino-substituted polyalkylpiperidine having the following general formula:

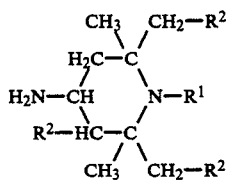

wherein $R^1$ is hydrogen, alkyl of 1 to 20 carbons, aliphatic acyl of 1 to 10 carbons or aromatic acyl of 7 to 12 carbons, and $R^2$ is hydrogen or lower alkyl of 1 to 4 carbons, and an ancillary amine comprising a primary monoamino-substituted alkane of 8 to 200 carbons or primary monoamine-terminated poly(oxyalkylene) of 8 to 200 carbons, to an anhydride-containing polymer with recurring units having the general formula:

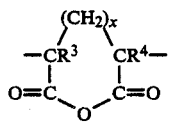

in which the units occur in the polymer backbone, on grafted side chains, as pendant units, or as combinations thereof, wherein x is 0 or 1 and $R^3$ and $R^4$ are independently hydrogen, alkyl of 1 to 6 carbons, cycloalkyl of 5 to 7 carbons, phenyl, chlorine or bromine, wherein the attachment is carried out in a melt blending step at a temperature above the softening point but below the degradation temperature of the polymeric product, yet at a sufficient temperature and for a sufficient residence time that essentially all the 4-amino-substituted polyalkylpiperidine and ancillary amine substituents in the polymeric product are present as substituted imide groups, and the water of reaction, excess amine and other volatile components are removed either simultaneously with the reaction, in a post reaction devolatilization step or a combination thereof.

12. A process of claim 11 wherein the 4-amino-substituted polyalkylpiperidine is 4-amino-2,2,6,6-tetramethylpiperidine, the ancillary amine is a monoamine-terminated block copolymer of ethylene oxide and propylene oxide or a primary 8-20 carbon alkyl amine, the anhydride containing polymer is a maleic anhydride copolymer, the reaction is carried out under an inert atmosphere in an extruder, plastograph, or Banbury mixer at a temperature above 150° C. and below 300° C. for a period of 30 seconds to 1 hour and the water of reaction is removed.

13. A process of claim 12 where the 4-amino-2,2,6,6-tetramethylpiperidine and ancillary amine are preblended with maleic anhydride copolymer prior to addition to the extruder, plastograph or Banbury mixer.

14. A process of claim 13 where 15–95% of the anhydride content of the copolymer is imidized with the 4-amino-2,2,6,6-tetramethylpiperidine and 5–85% of the anhydride content of the copolymer is imidized with the ancillary amine.

15. A process of claim 14 where the anhydride containing copolymer is octadecene-maleic anhydride copolymer and the ancillary amine is a monoamine-terminated block copolymer of ethylene oxide and propylene oxide of molecular weight range of approximately 300–600.

16. A process of claim 14 where the anhydride containing copolymer is octadecene-maleic anhydride copolymer and the ancillary amine is dodecylamine.

17. A process for the preparation of an imide copolymeric product containing a polyalkyl-4-piperidinyl substituent on the imide nitrogens of the copolymeric product by first pre-reacting a copolymer with recurring units having the general formula:

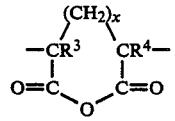

in which the units occur in the polymer backbone, on grafted side chains, as pendant units, or as combinations thereof, wherein x is 0 to 1, and $R^3$ and $R^4$ are independently hydrogen, alkyl of 1 to 6 carbons, cycloalkyl of 5 to 7 carbons, phenyl, chlorine or bromine, with a 4-amino-substituted polyalkylpiperidine having the following general formula:

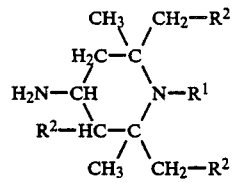

wherein $R^1$ is hydrogen, alkyl of 1 to 20 carbons, aliphatic acyl of 1 to 10 carbons or aromatic acyl of 7 to 12 carbons, and $R^2$ is hydrogen or lower alkyl of 1 to 4 carbons, at temperatures below 150° C. to form an amic acid and then cyclizing the amic acid to the desired imide copolymeric product in a melt blending step, in the absence of a solvent at a temperature above the softening point but below the degradation temperature of the copolymeric product, yet at a sufficient temperature and for sufficient residence time that essentially all the 4-amino-substituted polyalkylpiperidine substituent in the copolymeric product is present as substituted imide groups.

18. A process of claim 17 where the melt blending step is carried out in the presence of an inert polymer.

19. A process of claim 18 where the 4-amino-substituted polyarkylpiperidine is 4-amino-2,2,6,6-tetramethylpiperidine, the copolymer is octadecenemaleic anhydride copolymer and the imidization step takes place in an extruder at a temperature of 175–250° C.

20. A process for the preparation of an imide copolymeric product by
first pre-reacting a copolymer with recurring units having the general formula:

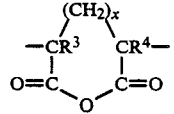

in which the units occur in the polymer backbone, on grafted side chains, as pendant units, or as combinations thereof, wherein x is 0 or 1, and $R^3$ and $R^4$ are independently hydrogen, alkyl of 1 to 6 carbons, cycloalkyl of 5 to 7 carbons, phenyl, chlorine or bromine, a 4-amino-substituted polyalkylpiperidine having the following general formula:

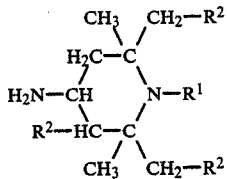

wherein $R^1$ is hydrogen, alkyl of 1 to 20 carbons, aliphatic acyl of 1 to 10 carbons or aromatic acyl of 7 to 12 carbons, and $R^2$ is hydrogen or lower alkyl of 1 to 4 carbons, and an ancillary amine comprising a primary monoamino-substituted alkane of 8 to 200 carbons or a primary monoamineterminated poly(oxyalkylene) of 8 to 200 carbons at temperatures below 150° C. to form amic acids, then cyclizing the amic acids to the desired imide copolymeric product in a melt blending step at a temperature above the softening point but below the degradation temperature of the copolymeric product, yet at a sufficient temperature and for a sufficient residence time that essentially all the 4-amino-substituted polyalkylpiperidine and ancillary amine substituents in the copolymeric product are present as substituted imide groups and removing the water of reaction and other volatile components either simultaneously with the reaction, in a post reaction devolatilization step or a combination thereof.

21. A process of claim 20 where the copolymer is a maleic anhydride copolymer, the 4-amino-substituted polyalkylpiperidine is 4-amino-2,2,6,6-tetramethylpiperidine, the ancillary amine is a primary monoamine-terminated block copolymer of ethylene oxide and propylene oxide or a primary 8-20 carbon alkyl amine, the maleic anhydride copolymer is pre-reacted in an inert solvent to form the amic acids, the solvent is removed and the amic acids are cyclized to the imide copolymeric product in a melt blending step.

22. The process of claim 21 wherein 15-95% of the anhydride content of the copolymer is reacted with the 4-amino-2,2,6,6-tetramethylpiperidine and 5-85% of the anhydride content of the copolymer is reacted with the ancillary amine.

23. The process of claim 22 where the maleic anhydride copolymer is octadecene-maleic anhydride copolymer and the ancillary amine is a primary monoamine-terminated block copolymer of ethylene oxide and propylene oxide of molecular weight range of approximately 300-600.

24. The process of claim 23 where the melt blending step is carried out in the presence of an inert polymer in an extruder.

25. The process of claim 24 where the inert polymer is polypropylene or polyethylene.

26. The process of claim 22 where the maleic anhydride copolymer is octadecene-maleic anhydride copolymer and the ancillary amine is dodecylamine.

27. The process of claim 26 where the melt blending step is carried out in the presence of an inert polymer in an extruder.

28. The process of claim 27 where the inert polymer is polypropylene or polyethylene.

29. The process of claim 21 wherein the inert solvent is xylene, toluene or tetrahydrofuran.

* * * * *